(12) United States Patent
Spicer et al.

(10) Patent No.: US 7,866,302 B2
(45) Date of Patent: Jan. 11, 2011

(54) METHOD AND SYSTEM FOR STARTING OR RESTARTING AN INTERNAL COMBUSTION ENGINE VIA SELECTIVE COMBUSTION

(75) Inventors: Gary J. Spicer, Mississauga (CA); Terry P. Cleland, Pickering (CA); Stan Zbyslaw Staniewicz, Barrie (CA)

(73) Assignee: Litens Automotive Partnership, Woodbridge, L4L 5T9 (CA)

( * ) Notice: Subject to any disclaimer, the term of this patent is extended or adjusted under 35 U.S.C. 154(b) by 74 days.

(21) Appl. No.: 12/123,782

(22) Filed: May 20, 2008

(65) Prior Publication Data

US 2008/0257311 A1    Oct. 23, 2008

Related U.S. Application Data

(63) Continuation of application No. 11/577,234, filed on Apr. 13, 2007, now Pat. No. 7,558,669, which is a continuation-in-part of application No. 11/146,727, filed as application No. PCT/CA2005/01632 on Oct. 24, 2005, now Pat. No. 7,188,021.

(60) Provisional application No. 60/621,767, filed on Oct. 25, 2004, provisional application No. 60/631,756, filed on Nov. 29, 2004, provisional application No. 60/652,722, filed on Feb. 14, 2005.

(51) Int. Cl.
*F02M 51/00* (2006.01)

(52) U.S. Cl. .................. 123/480; 123/488; 123/491

(58) Field of Classification Search ................. 123/480, 123/488, 486, 179.3, 491; 701/113, 115
See application file for complete search history.

(56) References Cited

U.S. PATENT DOCUMENTS

| | | | |
|---|---|---|---|
| 5,080,066 A | 1/1992 | Takeno et al. |
| 5,148,106 A | 9/1992 | Ozawa |
| 5,164,668 A | 11/1992 | Alfors |
| 5,186,136 A | 2/1993 | Kadomukai et al. |
| 5,321,979 A | 6/1994 | Mc Kendry et al. |

(Continued)

FOREIGN PATENT DOCUMENTS

EP    1 116 946 A2    7/2001

OTHER PUBLICATIONS

Data Management in Real Time Systems: A Case of On Demand Updates in Vehicle Control Systems, T. Gustafsson & J. Hansson; Proceeding of the 10th, 1EEE Real Time and Embedded.

(Continued)

*Primary Examiner*—John T Kwon
(74) *Attorney, Agent, or Firm*—Harness, Dickey & Pierce P.L.C.

(57) ABSTRACT

A selective combustion starting system and method selectively provides a proper amount of fuel to one or more combustion chambers in an internal combustion engine. The particular combustion chambers selected depend upon the state of the piston of the combustion chamber and the volume of the combustion chamber, which is dependent upon the position of the piston. Once proper amounts of fuel have been provided to the one or more combustion chambers, the resulting fuel air mixture in the combustion chambers is ignited and combusts to rotate the crankshaft of the engine to commence normal operation of the engine.

23 Claims, 6 Drawing Sheets

U.S. PATENT DOCUMENTS

| | | | |
|---|---|---|---|
| 5,537,967 A | 7/1996 | Tashiro et al. | |
| 5,568,048 A | 10/1996 | Schroeder et al. | |
| 5,637,998 A | 6/1997 | Kushihara | |
| 5,670,875 A | 9/1997 | Alfors et al. | |
| 5,678,521 A * | 10/1997 | Thompson et al. | 123/447 |
| 5,710,703 A | 1/1998 | Kirn et al. | |
| 5,860,406 A | 1/1999 | Schmidt et al. | |
| 5,979,413 A | 11/1999 | Ohnuma et al. | |
| 6,208,131 B1 | 3/2001 | Cebis et al. | |
| 6,212,783 B1 | 4/2001 | Ott et al. | |
| 6,288,533 B1 | 9/2001 | Haeberli et al. | |
| 6,326,781 B1 | 12/2001 | Kunde et al. | |
| 6,405,694 B2 | 6/2002 | Sato | |
| 6,498,479 B1 | 12/2002 | Hamaoka et al. | |
| 6,541,959 B2 | 4/2003 | Gudgeon et al. | |
| 6,586,929 B1 | 7/2003 | Luetzow | |
| 6,650,992 B2 | 11/2003 | Jankovic et al. | |
| 6,693,423 B2 | 2/2004 | Weser | |
| 6,732,713 B1 | 5/2004 | Yonezawa et al. | |
| 6,806,702 B2 | 10/2004 | Lamb et al. | |
| 7,017,556 B2 * | 3/2006 | Borg et al. | 123/491 |
| 2001/0050067 A1 | 12/2001 | Sato | |
| 2003/0020468 A1 | 1/2003 | Kato et al. | |
| 2003/0128026 A1 | 7/2003 | Lutz | |
| 2004/0160220 A1 | 8/2004 | Wendt | |
| 2004/0164729 A1 | 8/2004 | Ikeda et al. | |
| 2004/0207392 A1 | 10/2004 | Kernhof | |
| 2004/0217758 A1 | 11/2004 | Leonard | |
| 2005/0030012 A1 | 2/2005 | Kunz-Vizenetz | |

OTHER PUBLICATIONS

Technology and Applications Symposium (RTAS'04); May 25-28, 2004.

A Normalization Scheme to Reduce Numerical Errors in Inverse Tangent Computations on a Fixed Point CORDIC Processor, K. Kota, J.R. Cavallero; 1992 IEEE Symposium on Circuits and Systems, vol. 3, May 3-6, 1992, pp. 1061-1064, abstract, section 3.

* cited by examiner

METHOD AND SYSTEM FOR STARTING OR RESTARTING AN INTERNAL COMBUSTION ENGINE VIA SELECTIVE COMBUSTION

CROSS-REFERENCE TO RELATED APPLICATIONS

This application is a continuation of U.S. patent application Ser. No. 11/577,234 filed Apr. 13, 2007, which is a continuation-in-part of U.S. patent application Ser. No. 11/146,727 (which issued as U.S. Pat. No. 7,188,021 on Jun. 7, 2005) and which claims the benefit of U.S. Provisional Patent Application No. 60/621,767 filed Oct. 25, 2004, U.S. Provisional Patent Application No. 60/631,756 filed Nov. 29, 2004, U.S. Provisional Patent Application No. 60/652,722 filed Feb. 14, 2005, U.S. Provisional Patent Application No. 60/697,879 filed Jul. 8, 2005 and U.S. Provisional Patent Application No. 60/711,872 filed Aug. 26, 2005. U.S. patent application Ser. No. 11/577,234 is a national stage entry under 35 U.S.C. §371 of PCT/CA05/01632 filed Oct. 24, 2005. The disclosures of each of the above-referenced patent applications is incorporated by reference as if fully set forth herein in their entirety.

INTRODUCTION

The present disclosure relates to a method and system for starting or restarting an internal combustion engine. More specifically, the present disclosure relates to a method and system of starting or re-starting an internal combustion engine either solely, or in conjunction with another starter system, by combusting a fuel-air mixture in one or more cylinders of the engine.

Internal combustion engines are conventionally started by rotating the engine via an electric starter motor, or electric starter/generator or starter/alternator, to operate the valves, fuel and ignition and other systems of the engine. Fuel and spark are then provided to the cylinders of the engine in the attempt to initiate normal operation of the engine.

Such starter systems typically include a DC electric motor with a relatively small pinion which drives a relatively large ring gear on the flywheel of the engine. The gear ratio achieved between the pinion and the ring gear allow the starter motor to develop the necessary torque to rotate the internal combustion engine up to a starting speed.

While such starter systems are generally reliable, they do suffer from numerous disadvantages. The electric starter motor must be cable of producing sufficient torque to rotate the internal combustion engine and is thus typically quite large/heavy. The electric power required for the electric starter motor to rotate the internal combustion engine at a sufficient speed to permit starting of the engine is also very large, typically several hundred amps at twelve volts, requiring large power storage systems (typically lead acid batteries) with the corresponding heavy power cables, the use of solenoids to operate the starter, etc.

Further, such electric starter systems are typically over-designed for normal operating conditions as they must provide reliable starting during extreme starting conditions, such as sub-zero temperatures. This over design includes over-sizing the starter motor, over-sizing the storage battery, etc.

Accordingly, conventional electric starter systems increase the expense of the internal combustion engine and the weight of the overall engine system (due to the weight of the starter motor, power storage batteries, etc.), which decreases the fuel efficiency of the vehicle powered by the internal combustion engine. Further, such pinion and ring gear systems produce relatively high levels of noise when operated and such noise levels are now generally unacceptable, or at least undesirable.

Some recent vehicle designs employ stop-start drive strategies wherein the internal combustion engine may be stopped and re-started, as needed, during operation of the vehicle. For example, when the vehicle is stopped at a traffic light, etc., the internal combustion engine is stopped to enhance fuel economy and reduce emissions. When the light changes and the vehicle driver presses on the accelerator, the internal combustion engine is re-started and the vehicle moves from the traffic light.

In conventional internal combustion drive vehicles, a typical design criteria is that the starter system should be able to reliably operate to start the internal combustion engine about forty thousand times over the typical lifetime of the vehicle. With vehicles employing stop-start drive strategies, a typical design criteria is that the starter system should be able to reliably operate to start the internal combustion engine four hundred thousand times, or more, over the lifetime of the vehicle—at a minimum a ten-fold increase in the required expected operating lifetime. Accordingly, the electric starter motor system in such stop-start drive vehicles must be much more robust than in conventional systems, at best adding to the weight and expense disadvantages experienced with conventional electric starter systems.

Present attempts to provide suitable starting systems for stop-start drive vehicles have focused on alternator-starters or generator-starters. These systems are typically belt-drive systems wherein torque from the starter motor is applied to the engine via a belt drive, although some inline systems, wherein the generator-starter is inline in the drive train, have also been manufactured. However, such alternator-starter or generator starter systems are expensive to manufacture, add weight to the vehicle and also require ancillary components such as heavy duty belts or complicated control circuitry, to be included on the vehicle and require more volume, in the vehicle engine compartment, which may not be readily available.

SUMMARY

It is an object of the present invention to provide a novel system and method for starting or re-starting an internal combustion engine which obviates or mitigates at least one disadvantage of the prior art.

According to a first aspect of the present invention, there is provided a system for starting or re-starting an internal combustion engine via selective combustion, comprising: a sensor for determining the angular position of a rotatable member in the engine; a fuel injection system operable to provide determined amounts of fuel to combustion chambers in the engine; an ignition system operable to ignite the fuel air mixture resulting from the injection of the determined amounts of fuel into respective combustion chambers; an engine control unit operable to determine from the sensor, the state and position of the pistons in the engine and the volume of the respective combustion chambers formed by the pistons and to select at least one combustion chamber for selective combustion, the engine control unit operable to determine the volume of fuel to be provided to each selected combustion chamber and to have the injection system inject the determined amounts of fuel into each selected combustion chamber and to have the ignition system ignite the resulting fuel air mixture in each selected combustion chamber, the combustion of the fuel air mixture in the selected combustion chambers rotating the crankshaft of the engine to start normal operation of the engine.

According to another aspect of the present invention, there is provided A method for starting or re-starting an internal combustion engine via selective combustion, comprising the steps of: (i) determining the position and state of the pistons in the engine; (ii) selecting a piston for selective combustion based upon criteria including at least the state of the piston and the position of the piston within its respective cylinder; (iii) determining an appropriate amount of fuel to be provided to the selected piston; (iv) providing the determined amount of fuel to the selected cylinder; (v) igniting the fuel provided to the selected cylinder to combust the fuel, moving the piston in the cylinder to commence rotation of the engine; and (vi) commencing normal operation of the now rotating engine by supplying fuel and ignition to each piston in the engine, in turn.

BRIEF DESCRIPTION OF THE DRAWINGS

Preferred embodiments of the present invention will now be described, by way of example only, with reference to the attached Figures, wherein.

DETAILED DESCRIPTION OF THE VARIOUS EMBODIMENTS

The assignee of the present invention has developed a novel sensor system and method for measuring the angular position and/or speed of a rotating member. Aspects of this system and method are described in detail in co-pending U.S. provisional patent applications: Rotational Position Sensor Based Engine Controller System, Ser. No. 60/621,767, filed Oct. 25, 2004, Vehicle Control System And Method, Ser. No. 60/631,756, filed Nov. 29, 2004, System and Method For Measuring Torsional Vibrations In An Engine and Managing Operation of the Engine To Reduce Those Vibrations, Ser. No. 60/697,879, filed Jul. 8, 2005, Method and System for Starting Or Re-Starting An Internal Combustion Engine Via Selective Combustion, Ser. No. 60/711,872, filed Aug. 26, 2005 and co-pending U.S. patent application, Rotational Position Sensor Based Engine Controller System, Ser. No. 11/146,727, filed Jun. 7, 2005, the contents of each of which are incorporated herein by reference.

Figure 1:
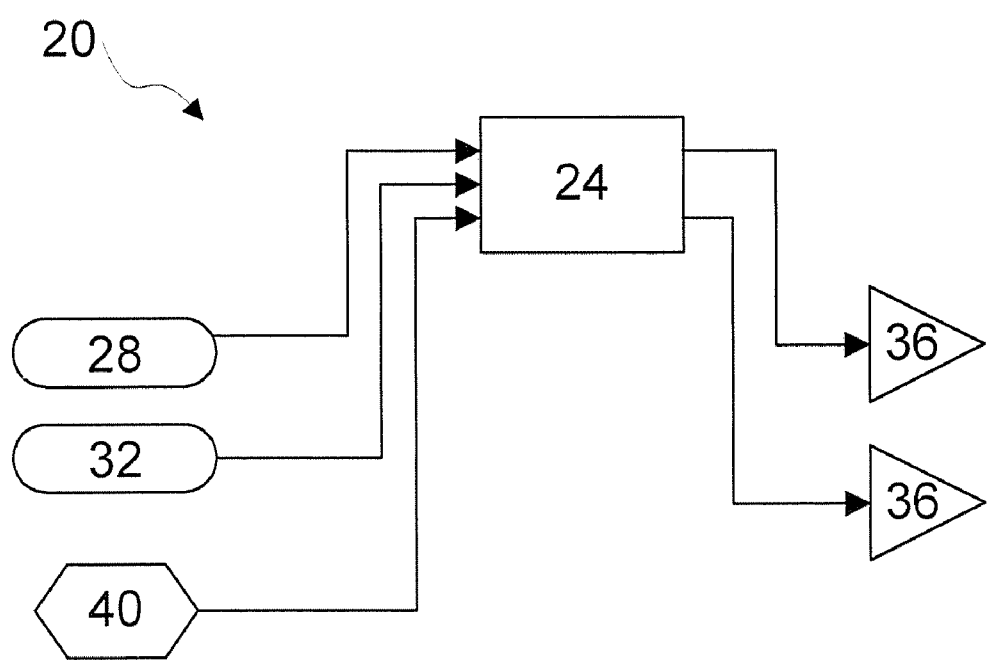
FIG. 1 is a schematic representation of a system for controlling the operation of a vehicle system in accordance with the present invention.

An engine control system in accordance with an embodiment of the present invention is indicated generally at 20 in FIG. 1. While the following discussion focuses on an engine controller and determining the phase angle between the crankshaft and at least one camshaft, the present invention is not so limited. As should be apparent to those of skill in the art, the present invention can also be employed with a wide variety of other vehicle systems, such as suspension, braking and various accessory systems and the controller can be, without limitation, a body control module (BCM), ABS control module or other vehicle controller.

In FIG. 1, control system 20 includes an engine control unit (ECU) 24 which can be a conventional ECU or the like as used in a variety of vehicles. ECU 24 includes a microprocessor or microcontroller and executes a control program which is stored in a ROM and/or FLASH RAM in ECU 24 and which is responsive to various defined inputs. ECU 24 processes the defined inputs in accordance with its control program and creates one or more corresponding outputs to control the engine or other vehicle systems accordingly.

Specifically, ECU 24 typically can accept one or more digital inputs 28 and one or more analog inputs 32. Digital inputs 28 can be sampled/buffered and acted upon by ECU 24, while analog inputs 32 are applied to an analog to digital (A/D) converter in ECU 24 to obtain a digital representation of the input upon which ECU 24 can than act upon.

As is also shown, ECU 24 produces one or more output control signals 36 which the ECU 24 employs to alter and control the operation of the engine or other vehicle systems it is controlling. Typically, output control signals 36 are analog signals produced by one or more digital to analog (D/A) converters in ECU 24, but output control signals 36 can also be digital signals.

In accordance with the present invention, ECU 24 is further supplied with a control signal from at least one angular position sensor 40. Sensor 40 is a magnetic rotation sensor, such as a model 2SA-10 Sentron sensor manufactured by Sentron AG, Baarerstrasse 73, 6300 Zug, Switzerland which is a differential Hall Effect sensor, or a KMZ41 magnetoresistive sensor from Philips Semiconductors or the like The following discussion assumes that the 2SA-10 sensor is employed but the changes required for other sensors, such as the KMZ41 will be apparent to those of skill in the art.

Figure 2:
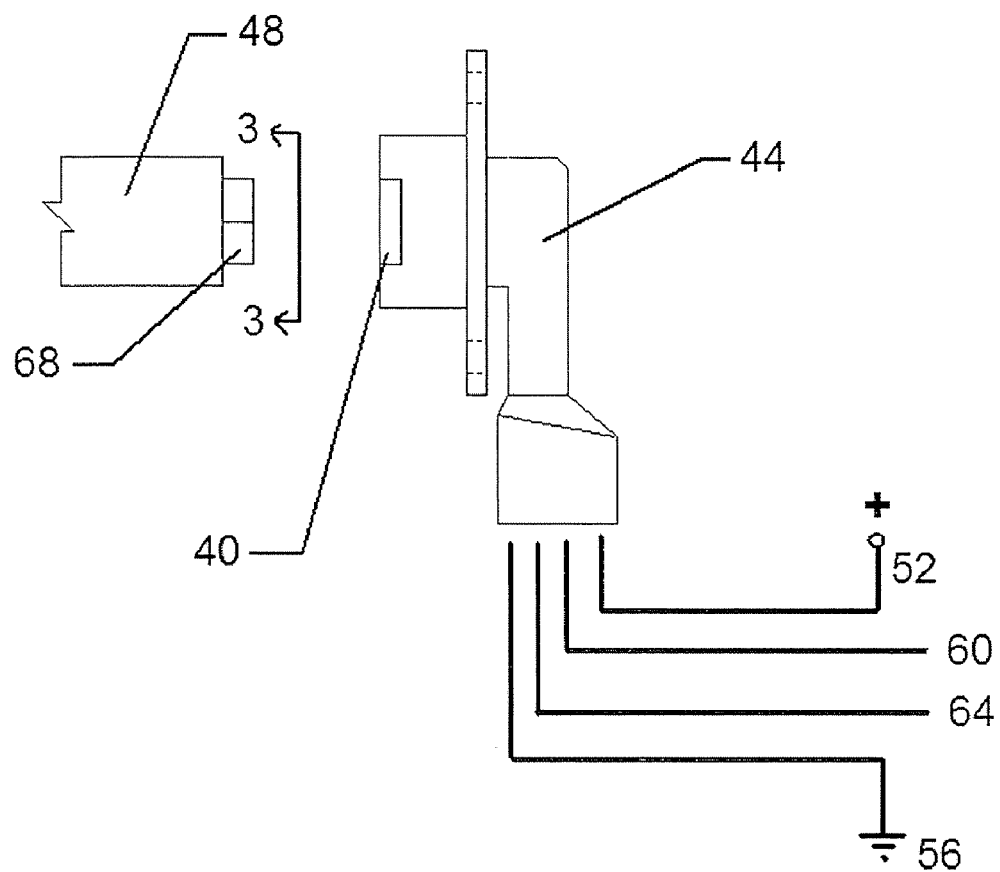
FIG. 2 is a schematic representation of a sensor, sensor carrier and signal magnet used in an embodiment of the present invention.

FIG. 2 shows one arrangement for using sensor 40 to determine the angular position of a rotating engine component which, in the illustrated embodiment, is a camshaft. Specifically, sensor 40 is mounted to a carrier 44 which can be positioned such that sensor 40 is located adjacent an end of a camshaft 48. Sensor 40 has four electrical leads associated with it, specifically a positive voltage source 52, an electrical ground 56 and two sensor output lines 60 and 64, discussed below.

Figure 3:
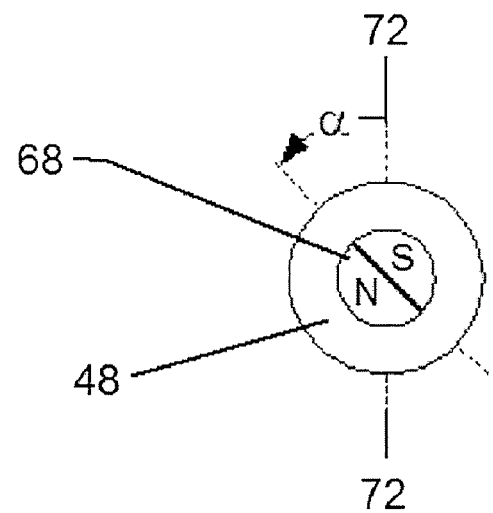
FIG. 3 shows a view, taken along line 3-3 of FIG. 2, of the sensor magnet of FIG. 2.

As shown in FIGS. 2 and 3, a dipole magnet 68 is mounted to center of the end of camshaft 48 such that sensor 40 will experience a North to South and a South to North transition as camshaft 48 experiences a complete (360°) revolution and dipole magnet is selected and spaced from sensor 40 such that sensor 40 is exposed to a level of magnetic flux which is appropriate for its operation. With the above mentioned 2SA-10 sensor, the appropriate level of magnetic flux is between 20 milliTeslas (mT) and 40 mT.

Dipole magnet 68 is mounted to camshaft 48 such that the angular position of camshaft 48 and the North-South transition of dipole magnet 68 are in a known relationship. This can be achieved in a variety of manners, including mounting dipole magnet on a carrier (not shown) which includes an index tab to engage a complementary index slot in camshaft 48, or by any other suitable method as will occur to those of skill in the art.

The positioning of the North-South transition of dipole magnet 68 with respect to a known position of camshaft 48 and the relative angular positioning of sensor 40 is preferably performed with a reasonable level of accuracy, but a level of error can be accommodated and dealt with by electronic calibration of sensor 40 and ECU 24 as will be apparent to those of skill in the art. The required degree of precision with which dipole magnet 68 must be positioned will vary with the desired resolution for determining the angular position of the rotating member.

In operation, when sensor 40 and dipole magnet 68 are properly positioned and configured as described above, sensor output lines 60 and 64 output respective control signals whose voltage varies with the change in the angular position α (as illustrated in FIG. 3) of the North-South transition of dipole magnet 68 with respect to a reference plane 72 of sensor 40.

With the above-mentioned 2SA-10 sensor, sensor output line 60 outputs a voltage signal proportional to the sin of α, i.e. sin(α), and sensor output line 64 outputs a voltage signal proportional to the cosine of α, i.e. cos(α). In a first embodiment of system 20, only one of sensor output lines 60 and 64 is employed by ECU 24 and this results in sensor 40 only requiring a three-wire harness which is the same as many conventional sensor systems require.

In the one or more of the above-mentioned co-pending U.S. provisional applications and U.S. patent application, both the sin(α) and cos(α) outputs of the 2SA-10 sensor are processed and a CORDIC algorithm is preferably employed to determine arctan(α) and obtain α. As will be apparent to those of skill in the art, while such a system and method can determine α with high resolution, the implementation of the CORDIC algorithm is computationally expensive and, to ensure that the determined result for α is available when needed, the ECU must be relatively powerful, computationally. Thus, an ECU in the previous inventions can be significantly more expensive than conventional ECUs. Further, as is apparent, with the system and method of the previous inventions an additional lead for the second sensor output line must be included in each sensor wiring harness.

Figure 4:
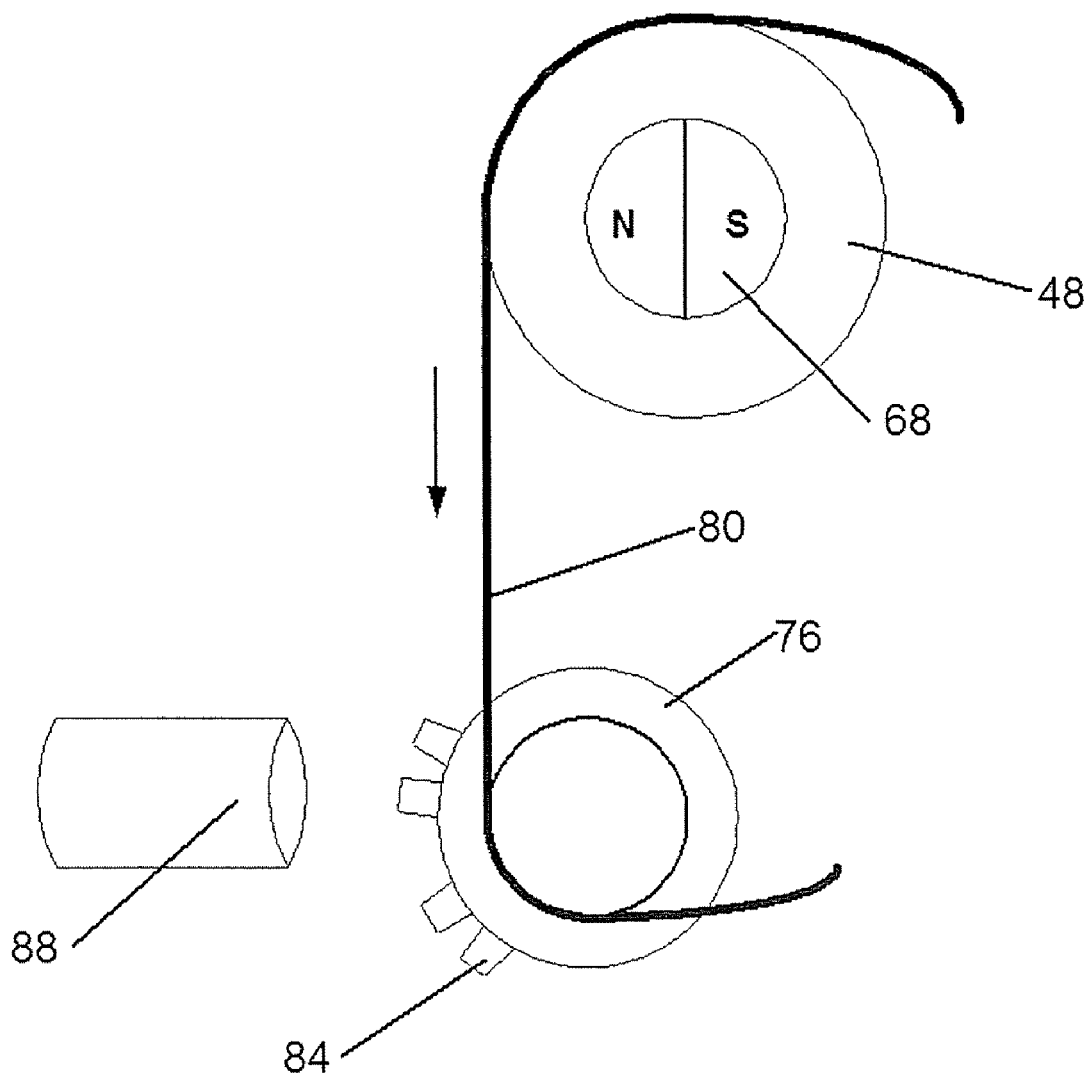
FIG. 4 shows a camshaft and crankshaft of an engine connected by a flexible drive means and a crankshaft position sensor and corresponding toothed gear on the crankshaft.

FIG. 4 shows a typical engine configuration which system 20 can be employed with. Specifically, camshaft 48 is synchronously linked to a crankshaft 76 via a flexible drive means 80, such as a timing belt or chain, or via a gear train (not shown). Crankshaft 76 is equipped with sensor to determine the angular position and/or speed of crankshaft 76 which can be a conventional toothed gear 84 and an inductive pickup sensor 88 or another sensor 40 or any other suitable means of determining the angular position and/or speed of crankshaft 76 as will occur to those of skill in the art.

In the present invention, as will be described below, system 20 can determine the angular position of camshaft 48 with respect to the position of crankshaft 76 (referred to herein as the phase of camshaft 48 with respect to crankshaft 76) at a selected angular position of interest for crankshaft 76, such as number one cylinder of an engine being at top dead center. Whether crankshaft 76 is at the selected angular position can be determined in any suitable manner, including the conventional technique of counting the teeth of gear 84 as they pass inductive pickup sensor 88.

Preferably, dipole magnet 68 is positioned on camshaft 48 such that the angular position α of the North-South transition of dipole magnet 68 with respect to reference plane 72 is zero degrees, or about zero degrees, or is one hundred and eighty degrees, or about one hundred and eighty degrees, when crankshaft 76 is at the selected angular position of interest and camshaft 48 is at its nominal position (zero phase with respect to crankshaft 76). Positioning the mounting of dipole magnet 68 in this manner allows for reduced computational requirements from ECU 24, but this is not an necessary feature of the invention and is merely preferred, as discussed below.

Figure 5:
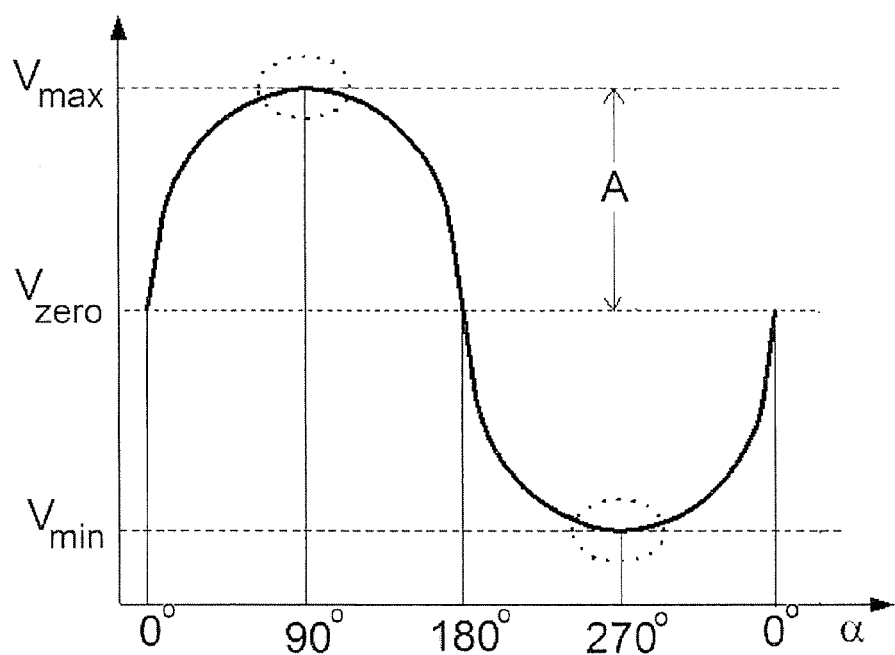
FIG. 5 shows a graph illustrating the output of the sensor of FIG. 2.

FIG. 5 shows the output of sensor output line 60. As illustrated, the output voltage $V_{sensor}$ of sensor output line 60 varies sinusoidally between a maximum output voltage $V_{max}$ and a minimum voltage value $V_{min}$ as angular position α ranges from zero to three hundred and sixty degrees.

It is desirable to normalize the output signal level of sensor output line 60 to simplify processing by ECU 24. Accordingly, $V_{max}$ and $V_{min}$ are determined by sampling the output of sensor output line 60, in the elliptically shaped regions shown in dashed line in the Figure. This sampling can be performed once and the relevant values stored, but it is preferred that the sampling be performed at appropriate intervals during the operation of the vehicle in which engine control system 20 is installed to ensure that any changes, or drift, due to aging of components or due to other causes can be compensated for.

Once a set of values for $V_{max}$ and $V_{min}$ have been determined, $V_{zero}$ is determined from $$V_{zero} = \frac{V_{max} + V_{min}}{2}$$

and the amplitude A, is determined from $$A = \left| \frac{V_{max} - V_{min}}{2} \right|$$

Thus, given $V_{sensor}$, sin(α) can be determined from $$\sin(\alpha) = \frac{V_{sensor} - V_{zero}}{A}$$

As will be apparent to those of skill in the art, sin(α) is approximately equal to α for small values of α (in radians). Thus, for values of up to about ±fifteen degrees, a reasonable approximation is $$\alpha = \frac{V_{sensor} - V_{zero}}{A}$$

although some scaling of the result may be required, but this can easily be accomplished in the execution of the control program in ECU 24.

If it is desired to determine α with greater precision, a memory in ECU 24 can be provided with an array of values of α corresponding to each measured sin(α) within a ninety degree quadrant. In essence, the values of α are predetermined and stored in an array where the signal measured by the sensor (after normalization and scaling) serves as the index to the array.

In a present embodiment, a ten bit scaling value (allowing values from 1 to 512) is employed wherein each normalized and scaled measured value acts as the index to a respective value stored in an array of 512 values, each stored value corresponding to α for its respective index value of 512*sin(α).

To avoid computationally expensive floating point arithmetic, in this embodiment it is preferred to represent the values of α using unsigned sixteen bit integers. Thus, a scaling factor of 0.01° is used for the values of α stored in the array. As will be apparent to those of skill in the art, scaling values of other than 512 and 0.01° can be used as desired.

Using fixed point arithmetic operations and $$\text{Index} = \frac{[512 * (V_{sensor} - V_{zero})]}{A}$$

ECU 24 can directly determine the particular array value representing the value of α, without requiring any computationally expensive calculations or search algorithms. As will be apparent to those of skill in the art, the required multiplication of ($V_{sensor} - V_{zero}$) by 512 can be achieved via a 10 bit shift operation and is thus very computationally efficient, although the order of operations should be performed in accordance with the brackets shown above, to otherwise avoid a possible loss of accuracy from the fixed point arithmetic operations.

To determine which quadrant α is in, ECU 24 can examine the polarity of $V_{sensor}$ over two or more samples to determine if it is negative-going-positive or positive-going-negative. Thus, once the quadrant is determined, the value of α can be determined very quickly and almost immediately after measuring $V_{sensor}$ even when ECU 24 is relatively limited computationally.

Once α has been determined by ECU 24, the value of α is used accordingly by ECU 24 when executing the control program of system 20 to produce a suitable output control signal 36.

Figure 6:
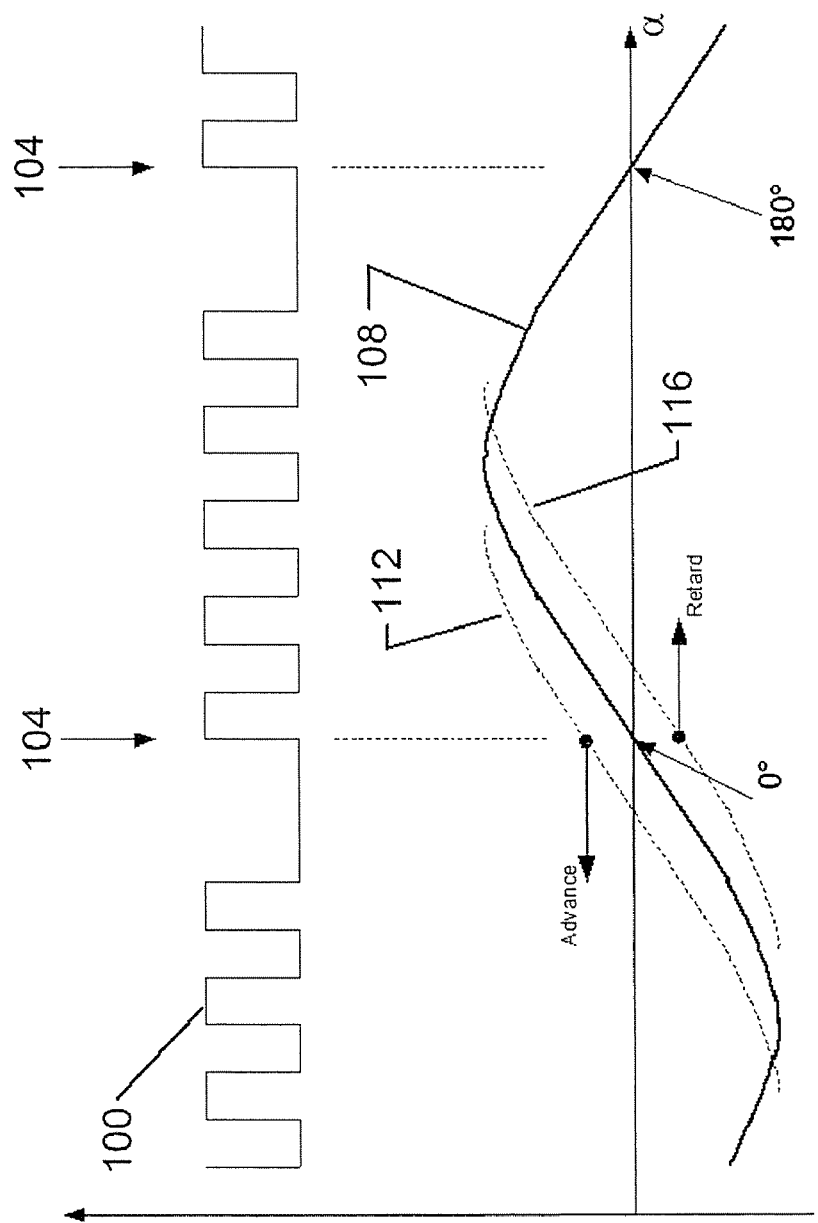
FIG. 6 shows a graph illustrating the output of the relative outputs of the crankshaft position sensor of FIG. 4 and the sensor of FIG. 2.

FIG. 6 shows the relationship between α and the measurement of the angular position of crankshaft 76, where dipole magnet 68 has been positioned on camshaft 48 and sensor 40 has been mounted such that α is zero when camshaft 48 is in its nominal (zero phasor) position. In the illustration, the measurement of the position of crankshaft 76 is achieved by counting the pulses in pulse train 100, with the selected angular position of interest of crankshaft 76 indicated by the pulses at positions 104. In the Figure, the nominal (zero phasor) position of camshaft 48 is indicated by solid line 108, an advance (positive phasor) position of camshaft 48 is indicated by dotted line 112 and a retarded (negative phasor) position of camshaft 48 is indicated by dotted line 116.

As is apparent in FIG. 6, the change in sin(α) in the vicinity of zero degrees and in the vicinity of one hundred and eighty degrees is approximately linear and becomes increasingly non linear as sin(α) approaches ±ninety degrees and ±two hundred and seventy degrees. It can be shown, and it will be apparent to those of skill in the art, that due to the non-linearities of the sin function, the resolution obtained with the present invention in a given quadrant varies from between about 1° to 4° of resolution for α in the range of about 90° to about 84°, about 0.2° to 1° of resolution for α in the range of about 83° to about 55° and to better than about 0.2° of resolution for α in the range of about 54° to about 0°.

For many rotating component measurements, such resolution exceeds the requirements for controlling the engine. In particular, variable valve timing systems typically run with camshaft position to crankshaft position phasors of less than ±thirty degrees, although some systems may have phasors as large as ±forty five degrees. In either case, the resolution of the present invention easily exceeds the resolution required by such systems.

As will also be apparent to those of skill in the art, system 20 can also provide an absolute position for camshaft 48, when camshaft 48 is rotating or stopped, should the determination of such a position be desired.

As discussed above, sensor 40 includes sensor output lines 60 and 64, with sensor output line 60 providing a voltage signal representing sin(α) and sensor output line 64 providing a voltage signal representing cos(α). While in the embodiment described above only sensor output line 60 was used, it is also contemplated that that both sensor output lines 60 and 64 can be used in other embodiments of the present invention, at the cost of including another wire in the wire harness to each sensor 40.

The processing of cos(α) is similar to that of processing sin(α) described above and should now be apparent to those of skill in the art and will not be discussed in detail herein. However, it should be noted that, if an array of values of α for each measurable sin(α) has been stored in ECU 24, this same array of values can be used to determine cos(α) by subtracting an offset value of the scaling value used for the array (512 in the embodiment discussed above) from the array index value Index. Thus, the index for cos(α) can be obtained from $$\text{Index} = 512 * \frac{V_{sensor} - V_{zero}}{A}$$

$$\text{Index}_{COS} = |\text{Index} - 512|$$

where, in this embodiment, $V_{sensor}$ is the output of sensor output line 64. Thus the array memory requirements are not doubled if both sensor output lines 60 and 64 are used.

One advantage to using both sensor outputs is that, as is known, the outputs of sin(α) and cos(α) are ninety degrees out of phase and thus the near-linear portions of each of their output curves occur at different angles α. As mentioned above, the greatest non-linear portion of sin(α) in the first quadrant occurs for α of between about 84° to about 90°. Similarly, the greatest non-linear portion of cos(α) in the first quadrant occurs for α of between about 0° to about 6°.

Thus, if the resolution of sensor output line 60 is in it's lower resolution range (α between about 84° to about 90°, for a resolution of between about 1° and 4°, as described above) then sensor output line 64 will be in it's high resolution range with a resolution of better than about 0.2°. In this case, if a high resolution position needs to be determined, ECU 24 can select either the output of the sensor output line 60 or 64, whichever is in its high resolution range, as determined by simply examining the polarities (to determine the quadrant) and magnitudes (to determine whether the sensor is in its higher resolution region) of the sensor outputs 60 and 64. Another advantage to using both sensor output lines 60 and 64 is redundancy. If a failure occurs with either of sensor output lines 60 or 64, system 20 can continue to operate with the remaining one of sensor output lines 60 or 64.

Yet another advantage to using both sensor output line 60 and 64 is that system 20 can accurately determine the static angular position of the rotating member. In the embodiment disclosed herein, where α is determined for camshaft 48, using both sensor output lines 60 and 64 to determine α when the engine is not running provides an accurate angular position of camshaft 48 and, indirectly, of crankshaft 76.

Specifically, in a non-running condition, the phasor between crankshaft 76 and camshaft 48 is known (typically it will be zero degrees) and thus a determined α will directly correspond to the angular position of crankshaft 76. By knowing the static position of crankshaft 76, system 20 can start the engine more efficiently, reducing emissions and reducing torsional forces in the engine at start up. As will be apparent to those of skill in the art, inductive sensors, such as sensor 88, cannot provide a signal when the sensed member (in this case crankshaft 76) is not rotating.

By using both sensor outputs 60 and 64, it is also simple to determine the absolute rotational position of the measured rotating member within a three hundred and sixty degree revolution. Specifically, ECU 24 will determine the polarity of each output line 60 and 64 to determine which quadrant the measured rotating member is in (i.e. "+/+"=$1^{st}$ quadrant; "−/+" second quadrant; "−/−" third quadrant; and "−/+" fourth quadrant) and then the value of α is determined, as described above. Then, depending upon the previously determined quadrant, zero, ninety, one hundred and eight or two hundred and seventy degrees are added to the determined α to obtain the absolute position.

In another embodiment, a pair of the three wire (one sensor output line 60 or 64) configurations described above can be employed, one on each of the intake and exhaust camshafts of a dual camshaft engine. In this manner, the phase (with respect to crankshaft 76) of each camshaft can be determined independently to provide ECU 24 with $α_{exhaust}$, the angular position of the exhaust camshaft 48, and $α_{intake}$, the angular position of the intake camshaft 48. Further, as the camshafts and crankshaft are connected by a synchronous drive (typically a flexible toothed drive belt, timing chain or gear train), if sensor output line 60 is used on one of the camshaft sensors and sensor output line 64 is used on the other camshaft sensor [i.e.—$\sin(α_{intake})$ and $\cos(α_{exhaust})$ are measured] then ECU 24 can determine the static angular position of crankshaft 76, assuming that the camshaft phasors with respect to crankshaft 76 are zero, or known.

In a similar embodiment, the sensors on each camshaft can use the same sensor output line, i.e.—both sensors use sensor output line 60 for $\sin(α)$ or both sensors use sensor output line 64 for $\cos(α)$. In this embodiment, ECU 24 determines the angular positions of the camshaft at different times. Specifically, ECU 24 determines the angular position of one camshaft at a first selected angular position of interest of crankshaft 76 and then determines the angular position of the other camshaft when crankshaft 76 has rotated to a second selected angular position, ninety degrees from the first selected angular position. As will be apparent to those of skill in the art, this is equivalent to determining $\sin(α_{intake})$ and $\cos(α_{exhaust})$ as discussed above, due to the ninety degree difference in the first and second selected angular positions of crankshaft 76 and the corresponding differences in angular position of the camshafts. This embodiment can be advantageous by only requiring ECU 24 to process the output of one sensor 40 at each of the two selected angular positions of crankshaft 76, thus allowing ECU to perform other processing operations between the two selected angular positions of crankshaft 76. This can be important if ECU 24 is relatively heavily loaded with computations for other vehicle systems.

The present invention provides a control system and method for controlling a vehicle system, such as an engine or vehicle dynamics system, wherein the controller uses the angular position of a rotating component, and in particular the angular phase of the rotating component to another rotating component, as an input. For example, in an engine with variable valve timing, the system and method can use the phasor between a camshaft and the engine crankshaft as an input to control the valve timing.

The phasor input is determined with high resolution, yet is determined in a computationally efficient manner which reduces the amount of computation which must be performed by the controller. By producing a high resolution result in a computationally efficient manner, the result can be available to the controller almost immediately after the measurement is taken and the expense of controller can be less than it otherwise would be, as less computation must be performed. Further, the engine, or other vehicle system, can be operated with increased accuracy and/or performance. In some embodiments, the system and method can also accurately determine the static angular position of one or more rotating members and/or can determine the absolute dynamic or static position of a rotating member.

As described above and in the above-referenced incorporated references, the novel sensor systems include a digital processor, an A/D converter (which can be integral with the processor or separate) and one or more sensors, each sensor preferably employing two pairs of oppositely orientated magnetic sensors, each pair arranged at right angles to one another, such as is available in the model 2SA-10 Sentron sensor manufactured by Sentron AG, Baarerstrasse 73, 6300 Zug, Switzerland.

The sensor is located adjacent at least one dipole magnet which rotates with the rotating member and, as the magnetic field from the dipole magnet rotates with the rotating member, the output from each sensor pair measuring the dipole's field is a sinusoid voltage signal, with the output of one sensor pair being ninety degrees out of phase with the output signal of the other sensor pair. The sinusoid voltages are converted to digital values by the A/D converter and provided to the processor which calculates the arctan($\tan^{-1}$) of the sinusoid voltages to determine the angular position of the rotating member.

Specifically, if the angular position of the rotating member is α, and the output voltage from the first sensor pair is $V_1$ and the output voltage from the second sensor pair is $V_2$, then α can be determined from:

$$V_1 = \cos(α)$$

$$V_2 = \sin(α)$$

$$\frac{V_2}{V_1} = \frac{\sin(α)}{\cos(α)} = \tan(α)$$

$$α = \arctan\left(\frac{V_2}{V_1}\right)$$

where

For ($V_1 > 0$, $V_2 > 0$), $α = \arctan(V_2/V_1)$;
For ($V_1 = 0$, $V_2 > 0$), $α = 90°$;
For ($V_1 < 0$), $α = 180° + \arctan(V_2/V_1)$;
For ($V_1 = 0$, $V_2 < 0$), $α = 270°$; and
For ($V_1 > 0$, $V_2 < 0$), $α = 360° + \arctan(V_2/V_1)$.

Unlike conventional engine sensor systems which typically comprise toothed gears with inductive or magnetic sensors, the angular position sensor systems described in the above-mentioned co-pending patent applications and preferably employed with the present invention provide relatively precise information (typically better than one degree) with respect to the angular position of a rotating member in an internal combustion engine. Further, unlike conventional sensor systems, the angular position sensor systems preferably employed with the present invention can provide position information with respect to the angular position of the rotating member when stopped and/or rotating at slow speeds. In contrast, the above-mentioned conventional sensor systems typically do not provide meaningful angular positional information for an engine until the engine is rotating at at least three hundred RPM.

Another advantage of the sensor system preferably employed with the present invention is that it is not-contacting (requiring no physical contact between the sensor and the rotating member) and thus can be utilized with a wide variety of rotating members including the engine crankshaft, camshaft(s), jackshaft or rotating members of engine subsystems such as an oil pump drive shaft or water pump drive shaft. Further, the preferred sensor system is, relative to other sensor systems commonly employed, very tolerant to variations in installation, including alignment with the dipole magnets and/or rotating member and movement of the rotating members, over time, due to wear and/or normal operations, etc.

While the present invention preferably employs the angular position sensor systems and methods described in the above-mentioned pending patent applications, the present invention is not so limited and, as will be apparent from the following description, any suitable sensor system or method which is capable of providing information indicating the angular position of a rotatable member of an engine, when that engine is stopped and when operating at start up speeds (typically below three hundred RPM), can be utilized.

Figure 7:
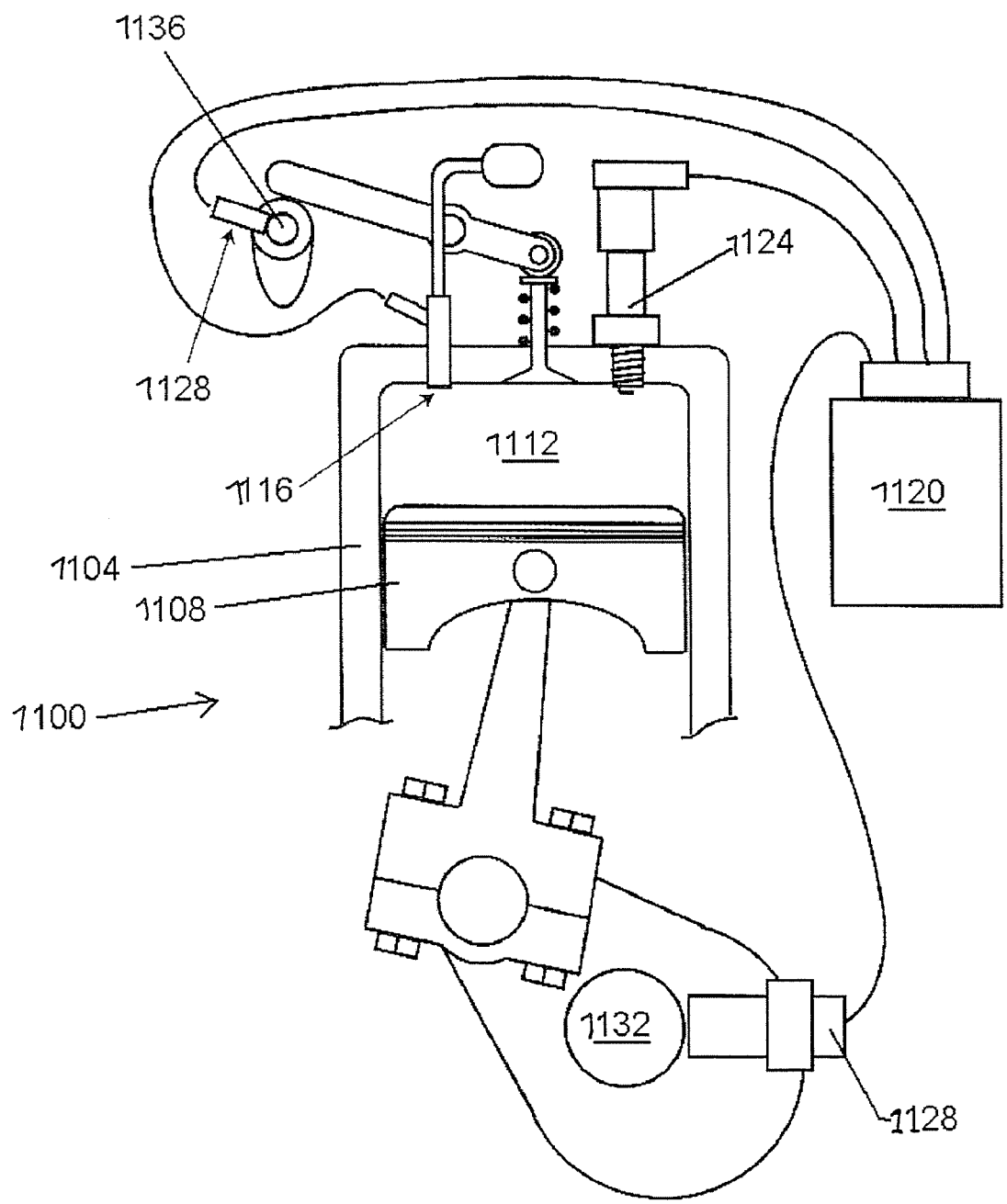
FIG. 7 a schematic view of a portion of an internal combustion engine employing a selective combustion starting system in accordance with the present invention.

FIG. 7 shows a schematic representation of a portion of an engine 1100 which includes a selective combustion starting system in accordance with the present invention. While just one is illustrated in FIG. 7, engine 1100 includes a series of cylinders 1104 and pistons 1108 which form combustion chambers 1112. Engine 1100 is equipped with a fuel injection system which permits individual injectors 1116 for each respective cylinder 1104 to be triggered as needed by an engine control unit (ECU) 1120. Similarly, the engine is equipped with an ignition system which permits individual spark plugs 1124 to be fired, for each respective cylinder 1104, as needed by ECU 1120.

As is also illustrated, the engine is equipped with one or more sensors 1128 which can provide information indicating the absolute angular position of a rotatable member of engine 1100, such as a crankshaft 1132 or camshaft 1136. If sensors 1128 are the particular sensors described above, then the processor to process the output signals of the sensors can be integral with ECU 1120 or can be a separate processor, not shown.

From the determined position of the rotatable member, ECU 1120 has, or can determine, the position of each piston 1108 in each respective cylinder 1104 of the engine, and thus the present volume of each combustion chamber 1112.

However, as will be apparent, it is not sufficient to determine the volume of combustion chambers 1112 as the state of each cylinder 1104/piston 1108 pair must also be determined as a piston 1108 can be moving toward or away from Top Dead Center (TDC) and, when moving towards TDC, can be in a compression stroke or an exhaust stroke, or, when moving away from TDC, can be in a power stroke or inlet stroke.

Accordingly, one method to identify the actual state of each cylinder 1104/piston 1108 pair is to determine the general position of camshaft 1136, which can be measured directly or derived from other information. If sensor 1128 is determining the position of crankshaft 1132 or another (non-camshaft) rotating member, a second sensor 1128 or any suitable other means can be used to determine the general position of camshaft 1136 to determine the state of cylinder 1104/piston 1108 pairs.

It will be understood that, if the position of pistons 1108 are known relatively accurately, the position of camshaft 1136 need not be determined with a high degree of accuracy as this information is only used to determine the state of pistons 1108. Thus it is sufficient to determine the angular position of camshaft 1136 with an accuracy in the range of tens of degrees. As will also be apparent, the rotatable member that sensor 1128 measures can be camshaft 1136 and, if sensor 1128 employs the above-described sensor, with the accuracy with which the position of camshaft 1136 can be determined with sensor 1128, ECU 1120 can determine the position and state of the pistons 1108 from this single measurement.

To start engine 1100, ECU 1120 determines the position and state of each piston 1108 in the engine using one or more sensors 1128. Depending upon the number of pistons 1108 in the engine, ECU 1120 selects at least one piston 1108 which is past TDC and whose state is such that the piston is on the combustion stroke (i.e.—the inlet and exhaust valves for the piston are both closed).

The selection of a piston 1108 can involve the consideration of several factors including, but not limited to, the volume of the combustion chamber 1112 formed by the respective piston 1108 and cylinder 1104 with the respective piston 1108 in its present position and the angle of the connecting rod extending between the respective piston 1108 and the crankshaft 1132 which angle changes the mechanical advantage between the piston 1108 and the crankshaft 1132. As will be apparent to those of skill in the art, the preferred values of these factors used in the selection process will vary from engine design to engine design, as characteristics such as the total engine starting inertia, the diameter of the cylinder bores, the length of the piston stroke, etc. will vary between engine designs.

An appropriate set of selection factors are provided to ECU 1120 which then selects one or more pistons 1108 for the selective combustion starting of engine 1100. ECU 1120 determines the volume of the respective combustion chamber 1112 formed by the selected respective piston 1108 and cylinder 1104 with the respective piston 1108 in its present position. This volume can be determined by accessing a pre-calculated look up table of data for engine 1100 or can be calculated as needed.

If a selected piston 1108 is near (just past) TDC, the volume of combustion chamber 1112 will be relatively low, while the mechanical advantage between the connecting rod and crankshaft 1132 will be relatively high. Conversely, if the selected piston 1108 is well past TDC the volume of combustion chamber 1112 will be relatively large while the mechanical advantage between the connecting rod and crankshaft 1132 will be relatively low. When a selective combustion starting system in accordance with the present invention is set up for engine 1100, a determination will be made by the designers of an optimal range of positions for pistons 1108.

Generally, a position of a piston 1108 which results in the angle of the connecting rod to crankshaft 1132 being in the range of from about sixty degrees (with zero degrees corresponding to the TDC position and one hundred and eighty degrees corresponding to BDC position) to about one hundred and twenty degrees is preferred, but specific engine designs will result in different preferred positions. As will be apparent to those of skill in the art, the preferred ranges of piston positions can be calculated from specific engine designs, or can be determined empirically.

When a piston 1108 is selected, ECU 1120 calculates an appropriate amount of fuel to provide for the volume of the selected combustion chamber 1112 which is formed by the selected piston 1108 in its current position. ECU 1120 can accept inputs from other sensors, such as sensors which measure ambient air temperature and density, engine temperature, etc. when calculating the appropriate amount of fuel. By accurately determining the volume of the combustion chamber 1112 for each respective selected chamber, as well as the other sensor inputs such as engine temperature, ambient air temperature, air pressure, etc., ECU 1120 can determine the appropriate amounts of fuel to be provided to each respective combustion chamber 1112 to obtain reliable starting and fuel and emission efficient combustion in the combustion chambers 1112.

As will be apparent now to those of skill in the art, during the starting operations ECU 1120 determines an appropriate amount of fuel in view of the fact that the selected combustion chamber 1112 is at ambient pressure (as pistons 1108 are stationary, the air in the respective combustion chamber 1112 is not compressed), rather than the over-ambient conditions which exist during normal operation of engine 1100.

When the appropriate amount of fuel is determined, ECU 1120 triggers the injector 1116 for the selected cylinder 1104 to inject the fuel into the respective combustion chamber 1112 and then fires the spark plug 1124 for the selected cylinder 1104 to ignite the fuel. The fuel in the selected cylinder 1104 combusts and forces piston 1108 down cylinder 1104, rotating crankshaft 1132.

As crankshaft 1132 is rotating, ECU 1120 then provides fuel and spark to each other piston 1108, in turn in the appropriate firing sequence, to continue rotating crankshaft 1132 and to bring the rotational speed of crankshaft 1132 up to a normal minimal operating speed (e.g.—about three hundred and fifty or more RPM).

It is contemplated that, after the selected cylinder 1104 has been fired, the next cylinder 1104 to be fired in the normal firing sequence will not produce its normal amount of compression of the air in its respective combustion chamber 1112, and/or will not contain it's normal volume of air, due to the fact that, when the selected cylinder 1104 was fired, the piston 1108 of the next cylinder 1104 to be fired would have been at a position above bottom dead center and would thus not move through a complete stroke length to compress the air the next combustion chamber 1112.

In such a case, ECU 1120 will be able to determine the position of piston 1108 of the next cylinder 1104, and thus the expected volume of air in the next combustion chamber 1112, from the position of the selected piston 1108 and ECU 1120 can use fuel/air mixtures, injection timings and ignition timings which are appropriate for the reduced amount of compression for the firing of this next cylinder 1104.

While ECU 1120 continues to bring the operating speed of engine 1100 up to a normal operating speed from a stopped speed, ECU 1120 can use fuel/air mixtures, injection timings and ignition timings which are appropriate for these slow operating speeds, which mixtures and timings may be different than those used when engine 1100 is operating at normal operating conditions and speeds. It is contemplated that in many circumstances these mixtures and/or timings will be conventional (as used during regular operation of the engine) but they can be altered, if desired, to reduce emissions or otherwise enhance the process of starting, or re-starting, the engine.

Another contemplated advantage of using the above-described sensor system with the present invention is that the sensor system can also provide accurate and reliable information to ECU 1120 to determine the rotational speed of engine 1100 as engine 1100 accelerates to normal operating speeds. ECU 1120 can use this rotational speed information to determine the amount of compression produced in each combustion chamber 1112 (which may be significantly less than the normal compression produced at the higher, normal engine operating speeds) when determining the appropriate amount of fuel to provide to each combustion chamber 1112 to meet performance and emissions requirements. If the present invention is employed with a different sensor system which is not able to provide accurate data with respect to the rotational speed of engine 1100 during this start up, it may be desirable to provide engine 1100 with additional sensors operable to provide an indication of the pressure/compression obtained in combustion chambers 1112 as engine 1100 is being started.

In the example described above, if engine 1100 has eight or more cylinders, it may not be sufficient to supply fuel and spark to a single combustion chamber 1112 to start rotation of crankshaft 1132 due to the friction and inertia of the larger number of engine components. In such a case ECU 1120 can select two or more pistons 1108 which are positioned after TDC and which are in the combustion stroke state. In such as case, ECU 1120 will determine an appropriate amount of fuel for the volume of the combustion chamber 1112 formed by each piston 1108, which amount will be different for each combustion chamber 1112 as each combustion chamber 1112 will have a different volume.

ECU 1120 will then trigger the respective injector 1116 to inject the respective determined amount of fuel into each respective combustion chamber 1112 and will fire the respective spark plug 1124 for each combustion chamber 1112. By firing two, or more, cylinders 1104 simultaneously, rotation of crankshaft 1132 can be initiated despite relatively high levels of friction an/or inertia.

In the examples above, the engine is started solely by selective combustion of fuel supplied to one or more combustion chambers 1112. However, it is contemplated that in adverse operating conditions, such as extreme cold conditions, or for engines with very high starting loads, such a system may not be sufficient to provide an assured ability to start the engine. In such a case, it is contemplated that the selective combustion can be combined with an electric starter motor, such as a conventional pinion/ring gear starter, or with a belt drive alternator starter. In this case, the selective combustion system described above can be used to overcome the relatively high levels of starting friction and inertia to assist the starter motor so that the starter motor need only produce a much lower amount of torque to complete the starting of engine 1100. Thus, the size and weight of the starter motor can be reduced, as can the associated batteries and cabling systems.

As should now be apparent to those of skill in the art, selective combustion of the present invention can be utilized instead of, or in combination with, electric starting systems such as pinion/ring-gear starter motors or alternator-starters to start engine 1100.

It is further contemplated that the combustion start system described herein can be combined with a belt-drive alternator/starter, or a pinion/ring gear electric motor, which is used to incrementally move crankshaft 1132 to "jog" a piston 1108 to an optimal position with its cylinder 1104 for selective combustion to start engine 1100.

For example, in a four cylinder engine, it may be that no piston 1108 is both in the combustion state and is in an position wherein the volume of its respective combustion chamber 1112 is close to optimal for providing enough force to start the engine. In such a case ECU 1120 can control an alternator/starter or electric motor to move crankshaft 1132 such that a piston 1108 in the correct state will be located at, or near, a position wherein a desired volume of its respective combustion chamber will be obtained. As this movement of crankshaft 1132 can be performed much less quickly than would be required for starting engine 1100 conventionally with a starter motor, the electric motor employed for this purpose can be much smaller than conventional electric starter motors and can require much lower electric currents to operate. Accordingly, the above-described weight and or disadvantages of conventional electric starter motors can be avoided.

It should be noted that the electric motor employed to move crankshaft 1132 can operate to rotate crankshaft 1132 in either direction, to move a piston 1108 back towards or away from TDC as necessary.

Recent advances in engines have included electronically controlled valve trains. In such systems, inlet and exhaust valves are opened and closed via solenoids, hydraulic actuators, or other electronically controlled systems. If engine 1100 employs such an electronically controlled valve train, ECU 1120 can selectively combust all, or a subset of, the combustion chambers 1112 of cylinders 1104 which are past TDC, as the state of the pistons 1108 can effectively be set, as needed, by appropriate operation of the electronic valve trains. Thus, for example, in an eight cylinder engine as many as four cylinders can be selectively combusted at one time to provide an initial force to rotate crankshaft 1132. As will be apparent to those of skill in the art, engines with such electronically controlled valve trains do not include a camshaft. One method to implement such an engine is to employ a sensor 1128, such as the above described sensor, to determine the position of crankshaft 1132 and to have ECU 1120 initially decide the desired state of the pistons 1108 and then to dynamically update that state corresponding with the measured rotation of crankshaft 1132. In such a case, ECU 1120 will know and/or be able to establish, the position and state of all pistons 1108 in the engine without the presence of a camshaft.

The present inventors believe that the selective combustion system and method described herein is particularly useful with vehicles employing stop-start drive techniques wherein the gasoline engine is stopped when the vehicle is stopped at traffic lights, or in traffic, etc. To date, such stop-start drive systems have required electric starter systems with pinion/ring gear starter motors which are much more robust than conventional electric starter systems as the starter system will is required to operate much more often than those of conventional internal combustion engines and/or which require belt-drive alternator/starters to augment, or replace, the electric starter motor. Thus, the starter systems employed with stop-start drive systems are typically heavier and more expensive than conventional electric starters.

By instead employing the above-described selective combustion system and method for restarting the engine in a stop-start drive, the weight, expense and/or reliability issues with electric starter systems can be avoided.

Further, as stop-start strategies involve restarting an engine which was recently stopped, the engine will typically be at, or near, its normal operating temperature thus reducing the initial starting load which would result from cold engine oil, etc. which enhances the ability of the above-described selective combustion starting system and method to efficiently restart the engine.

It is contemplated that it may be desirable in some circumstances to employ a combination of selective combustion starting with an electric starting motor or alternator/starter, as described above, for stop-start drive vehicles and such a combination is also within the scope of the present invention.

The selective combustion starting system and method described herein provides an efficient method for starting and/or restarting internal combustion engines by selectively providing a proper amount of fuel to one or more combustion chambers in the engine. The particular combustion chambers selected depend upon the state of the piston of the combustion chamber and the volume of the combustion chamber, which is dependent upon the position of the piston. Once the proper amounts of fuel have been provided to the one or more combustion chambers, the resulting fuel air mixture in the combustion chambers is ignited and combusts to rotate the crankshaft of the engine to commence normal operation of the engine.

The described selective combustion starting can be employed instead of, or in combination with, an electric starter motor and/or alternator/starter. The starting system and method is reliable, inexpensive to implement and is quieter in operation than conventional pinion and ring gear electric starter systems.

The above-described embodiments of the invention are intended to be examples of the present invention and alterations and modifications may be effected thereto, by those of skill in the art, without departing from the scope of the invention which is defined solely by the claims appended hereto.

It will be appreciated that the above description is merely exemplary in nature and is not intended to limit the present disclosure, its application or uses. While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A system for starting or restarting an internal combustion engine via selective combustion, comprising:
   at least one sensor configured for determining the angular position of a rotatable member in the engine at any rotational position of the rotatable member;
   a fuel injection system operable to provide determined amounts of fuel to combustion chambers in the engine;
   an ignition system operable to ignite the fuel air mixture resulting from the injection of the determined amounts of fuel into respective combustion chambers;
   an engine control unit operable to determine, from the at least one sensor, the state and position of the pistons in the engine and the volume of the respective combustion chambers formed by the pistons and to select at least one combustion chamber for selective combustion, the engine control unit operable to determine the amount of fuel to be provided to each selected combustion chamber and to have the injection system inject the determined amounts of fuel into each selected combustion chamber and to have the ignition system ignite the resulting fuel air mixture in each selected combustion chamber, the combustion of the fuel air mixture in the at least one selected combustion chamber rotating the crankshaft of the engine to start normal operation of the engine.

2. The system of claim 1 wherein the engine control unit selects at least two combustion chambers.

3. The system of claim 1 wherein the engine further includes an electric starter motor, the electric starter motor cooperating with the rotation of the crankshaft by the combustion of the fuel air mixture to start normal operation of the engine.

4. The system of claim 3 wherein combustion of the fuel air mixture overcomes the initial inertia of the engine and the electric starter motor then rotates the engine to complete the starting of normal operation of the engine.

5. The system of claim 1 wherein the engine further includes an electric motor operable by the engine control unit to rotate the engine to position at least one piston in the engine to obtain at least one combustion chamber of a desired volume for selection by the engine control unit.

6. The system of claim 5 wherein the electric motor is operable to rotate the engine in forward and reverse directions to position the at least one piston.

7. The system of any of claims 1-6 wherein the system is employed in a stop-start drive vehicle.

8. A method for starting or re-starting an internal combustion engine via selective combustion, comprising:
   (i) determining the position and state of the pistons in the engine regardless of the position of the pistons;
   (ii) selecting a piston for selective combustion based upon criteria including at least the state of the piston and the position of the piston within its respective cylinder;
   (iii) determining an appropriate amount of fuel to be provided to the selected piston;
   (iv) providing the determined amount of fuel to the selected cylinder;
   (v) igniting the fuel provided to the selected cylinder to combust the fuel, moving the piston in the cylinder to commence rotation of the engine; and
   (vi) commencing normal operation of the engine after step (v).

9. The method of claim 8 wherein said appropriate amount of fuel is a stoichiometric amount.

10. The method of claim 8 wherein step (i) includes determining a position of each piston relative to top dead center.

11. The method of claim 10 wherein step (i) includes determining whether a piston is in a combustion stroke.

12. The method of claim 8 wherein the engine has an electrically controllable valvetrain and step (i) comprises determining the position of the pistons in the engine and selecting a state for said pistons and further comprising the step of, between steps (iv) and (v), operating the valvetrain to obtain the selected state for the pistons.

13. The method of claim 12 wherein said appropriate amount of fuel is a stoichiometric amount.

14. The method of claim 12 wherein step (i) includes determining a position of each piston relative to top dead center.

15. The method of claim 14 wherein step (i) includes determining whether a piston is in a combustion stroke.

16. The method of claim 12 wherein steps (ii) to (v) are simultaneously carried out on at least two pistons.

17. The method of claim 16 wherein said appropriate amount of fuel is a stoichiometric amount.

18. The method of claim 16 wherein step (i) includes determining a position of each piston relative to top dead center.

19. The method of claim 18 wherein step (i) includes determining whether a piston is in a combustion stroke.

20. The method of claim 8 wherein step (ii) includes rotating the engine to position the piston in a selected position to ensure that step (v) drives the engine in a selected rotational direction.

21. The method of claim 20 wherein said appropriate amount of fuel is a stoichiometric amount.

22. The method of claim 20 wherein step (i) includes determining a position of each piston relative to top dead center.

23. The method of claim 22 wherein step (i) includes determining whether a piston is in a combustion stroke.

* * * * *